Figure 1:
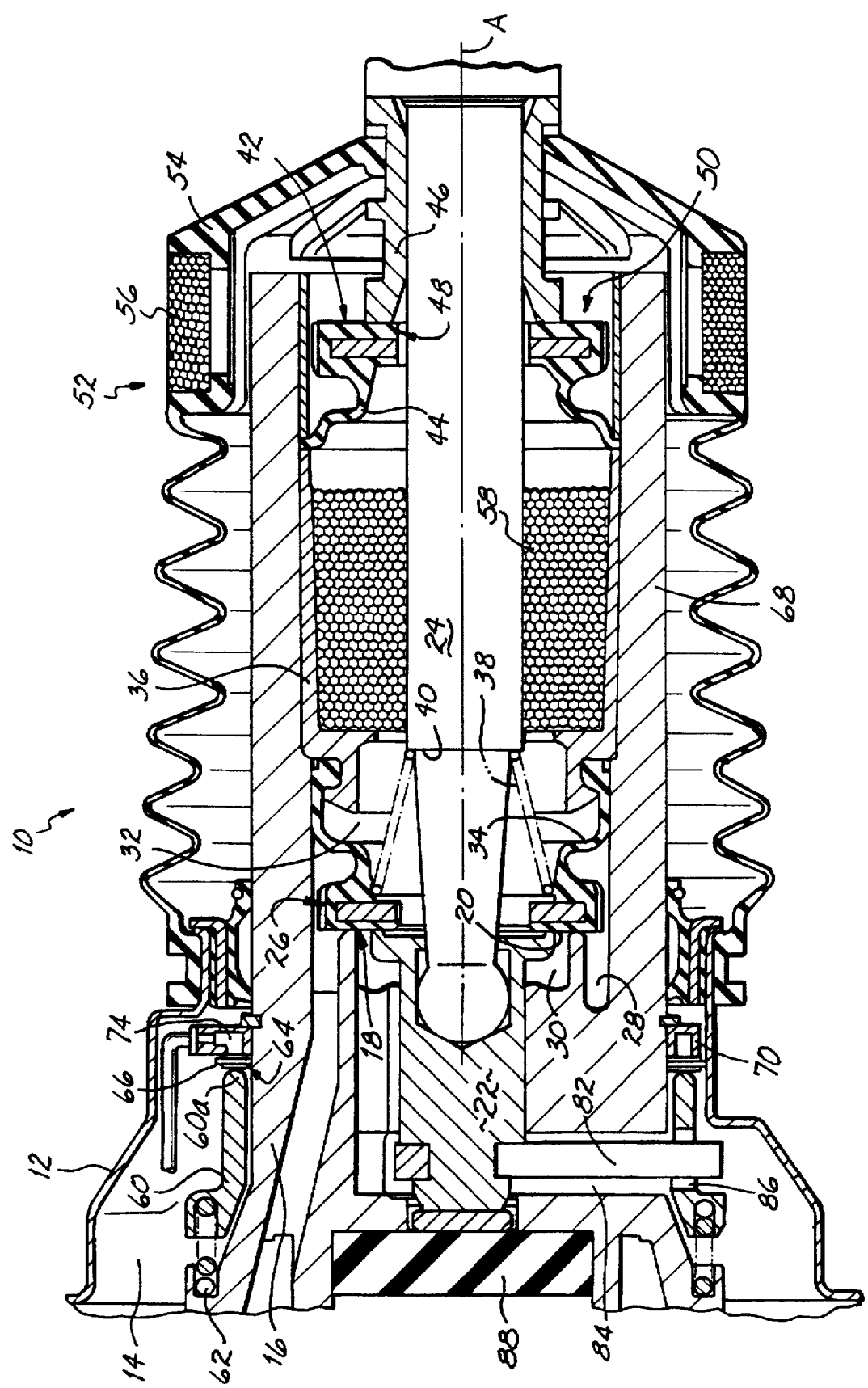

United States Patent [19]

Kaub

[11] Patent Number: 5,778,754
[45] Date of Patent: Jul. 14, 1998

[54] VALVE ASSEMBLY

[75] Inventor: Manfred Kaub, Rhens, Germany

[73] Assignee: Lucas Industries public limited company, Great Britain

[21] Appl. No.: 824,503

[22] Filed: Mar. 26, 1997

Related U.S. Application Data

[63] Continuation of PCT/EP95/04179 Oct. 25, 1995 published as WO96/14230 May 17, 1996.

[30] Foreign Application Priority Data

Nov. 7, 1994 [DE] Germany .................. 94 17 819 U

[51] Int. Cl.$^6$ .......................... F01B 25/02; F15B 9/10
[52] U.S. Cl. .................... 91/25; 91/369.2; 91/376 R
[58] Field of Search ................ 91/6, 24, 25, 369.2, 91/376 R

[56] References Cited

U.S. PATENT DOCUMENTS

| | | | |
|---|---|---|---|
| 5,056,413 | 10/1991 | Kaub | 91/369.3 |
| 5,161,452 | 11/1992 | Horner, Jr. et al. | |
| 5,193,429 | 3/1993 | Sugiura et al. | 91/6 |

FOREIGN PATENT DOCUMENTS

| | | |
|---|---|---|
| 0368691A1 | 5/1990 | European Pat. Off. . |
| 0405603B1 | 10/1994 | European Pat. Off. . |
| 2206219A1 | 6/1974 | France . |
| 3806401A1 | 9/1989 | Germany . |

*Primary Examiner*—Edward K. Look
*Assistant Examiner*—Bijan N. Karimi
*Attorney, Agent, or Firm*—Wood, Herron & Evans, L.L.P.

[57] ABSTRACT

A valve assembly (10) for controlling a pneumatic brake booster comprises a valve housing (16) with a first and a second valve seat (18, 20) as well as with a valve body (26) adapted to be applied to both valve seats (18, 20). In one position of an operating member (24) the valve body (26) is lifted off the first valve seat (18) only, while in another position of the operating member (24) it is lifted off the second valve seat (20). Radially outside the valve housing (16) an annular third valve seat (64) and a control sleeve (60) surrounding the valve housing are arranged, which as an additional valve body can be axially moved by means of the operating member (24) relative to the valve housing (16). Upon an actuation of the operating member (24) which goes beyond the movement required for lifting the valve body (26) off the second valve seat (20), a venting channel formed by a ring (70) which at least partially surrounds the valve RSLM housing (16) is opened, is arranged on the valve housing (16) at an axial distance from the control sleeve (60) and comprises a hollow space (74) with an inlet (78) connected with an air supply (76) and an outlet (80). A valve assembly (10) of such a design can be manufactured more economically without functional disadvantages.

7 Claims, 2 Drawing Sheets

VALVE ASSEMBLY

This application is a continuation of international application PCT/EP95/04179 filed Oct. 25, 1995, published as WO96/14230 May 17, 1996, currently pending.

The invention relates to a valve assembly with the characteristics listed in the preamble of claim 1, which is employed for controlling a pneumatic brake booster.

Normally, pneumatic brake boosters comprise two chambers, a vacuum chamber and a working chamber, which are separated from each other by means of a movable diaphragm. In this case, the term "two chambers" shall also include two groups of interconnected chambers as provided in brake boosters of tandem design.

In pneumatic brake boosters with valve assemblies of the type mentioned the vacuum chamber is permanently connected with a vacuum source, e.g. the suction line of an Otto engine, and the working chamber is connected, in a rest position of the valve assembly, with the vacuum chamber and is therefore also evacuated. Upon activation of the valve assembly it is moved into an operating position in which the working chamber is disconnected from the vacuum chamber and connected with an air inlet so that ambient air is able to flow into the working chamber, with the pressure generated therein displacing the movable wall arranged between the two chambers. The movable wall which separates the two chambers from each other in turn operates a force output member for actuating a master cylinder which is connected with the brake booster.

It is known to supply ambient air to the working chamber of a pneumatic brake booster not only via the mentioned air inlet but also to provide an additional venting channel by means of which air can also be supplied to the working chamber in certain situations. By means of such an additional venting channel, the function of which is generally controlled by an additional valve, it is possible, for example, to achieve a more rapid response of the braking system of a vehicle under emergency braking conditions. It is also known to use the additional venting channel for the supply of compressed air in order to increase the amplification ratio of a given pneumatic brake booster. Brake boosters or valve assemblies, respectively, of the previously described type are known for example from EP 0 368 691 A1, FR 2,206,219 A1 and DE 38 06 401 A1. A generic valve assembly is described in EP 0 405 603 B1.

In known valve assemblies with an additional venting channel the problem exists that in order to control the additional air supply via the venting channel, which must be effected depending on a brake pedal actuation, relatively numerous and go; complicated parts are required, thus resulting in high manufacturing costs. Notwithstanding their undisputed advantages, valve assemblies with an additional venting channel are still a rarely found occurrence.

The invention is based on the object to further develop a generic valve assembly in such a manner that controlling of the additional venting channel is facilitated, while simultaneously ensuring an assembly of the valve assembly as simple as possible in order to significantly reduce the overall manufacturing costs.

This object is solved on the basis of a generic valve assembly according to the invention in such a manner that the additional venting channel is formed by a ring surrounding the valve housing, which is arranged on the valve housing at a radial distance from the control sleeve and which comprises a hollow space with an inlet connected to the air supply and an outlet opening into the chamber which can be connected to the air inlet. The inventive ring provided with a hollow space, which may surround the valve housing in the circumferential direction completely or only partially, is adapted for a most simple installation because all that has to be done is to push it over a neck-shaped extension of the valve housing which, in the completely assembled condition, protrudes from the housing of the brake booster. In preferred embodiments of the inventive valve assembly, the ring according to the invention is secured against an axial displacement by means of a simple circlip on the neck-shaped extension.

The inventive configuration of the additional venting channel as a ring with a hollow space further enables the advantageous modifications and further developments of the inventive valve assembly as set out in the dependent claims.

According to a preferred embodiment of the inventive valve assembly, for example, the ring is formed with an at least essentially U-shaped cross-section, whereby the open face of the ring forms the outlet of its hollow space. Such an embodiment is particularly advantageous if the outlet of the hollow space faces the control sleeve and the third valve seat is formed by an annularly closed sealing disk which is arranged in an axially floating manner on the valve housing between the control sleeve and the ring. In this embodiment the third valve is double-acting: on the one hand, it seals the outlet of the hollow space of the ring and, on the other hand, it provides a seal against the control sleeve. The axially floating support of the double-acting sealing disk of annular and closed form permits easy installation and does not require any adjustment.

In a modified, suitable embodiment of the inventive valve assembly the transmission member is securely connected with the second valve seat and, under an axial clearance, extends through one radial recess each of the valve housing and the control sleeve, whereby the axial clearance of the transmission member relative to the valve housing is larger than the axial clearance of the transmission member relative to the control sleeve. This type of mechanical coupling of the second and third valve seat provides a simple way of precisely determining the opening behaviour of the second and third valve seat.

In modified preferred embodiments of the inventive valve assembly the additional venting channel is connected with a compressed air source via the air supply. In embodiments of this type the additional third valve opens only when the brake booster has reached its point of maximum deflection, i.e. when the movable wall between the vacuum chamber and the working chamber of the brake booster—a normal actuation of the brake system provided—has been moved as far as possible in a direction for activating the connected brake cylinder and the maximum differential pressure between the vacuum chamber and the working chamber has been achieved. With a continued activation of the valve assembly in this condition, generally by a continued actuation of the brake pedal, the third valve opens and compressed air flows through the additional venting channel into the working chamber of the brake booster, thereby increasing the output force of same and actuating the brakes which are connected with the master cylinder in a correspondingly stronger manner. Upon sudden actuation of the brake pedal, e.g. in the case of an emergency braking operation, the third valve, however, opens the additional venting channel before the point of maximum deflection of the brake booster is reached so that as a result of a pressure buildup as rapidly as possible in the working chamber of the brake booster, the response time of the brake system is minimized, with a high braking pressure being available at the earliest possible time.

If the additional venting channel is connected with a compressed air source, an opening of the additional third valve only after the point of maximum deflection of the brake booster is reached has the additional advantage that the entire brake booster can be kept very compact despite its good amplification capability. It was found that for the majority of all braking operations under normal driving conditions the maximum possible amplification of conventional pneumatic brake boosters is not required by any means. However, this means that in the majority of cases a considerably smaller brake booster, i.e. a brake booster with a reduced amplification power, would be sufficient. Such a smaller brake booster would occupy considerably less installation space because of its less voluminous housing, which is desirable in particular with respect to the prevailing confinement in the engine compartment of modern vehicles as results in compact vehicles or in vehicles equipped with numerous options because of the crowded arrangement of units in the engine compartment. Because of its economic manufacture and its simple installation, the inventive valve assembly permits on a broad basis the use of such smaller pneumatic brake boosters in vehicles, whereby the required additional energy in the case of an emergengy braking operation is provided by the compressed air which is fed into the working chamber of the brake booster through the additional venting channel which is controlled by the third valve. The majority of the "normal braking operations" of the routine driving operation, however, is carried out in an energy saving manner without the assistance of compressed air.

Regardless of whether the additional venting channel of the inventive valve assembly is connected with a compressed air source or with ambient air only, the third valve which controls the additional venting channel is arranged in such a manner that with a brake booster in the completely installed condition it is disposed inside a housing of same.

The various embodiments of the inventive valve assembly permit an installation of the third valve seat without necessitating a modification of the valve housing compared to conventional valve assemblies. The inventive valve assembly can thus be advantageously integrated in existing manufacturing lines.

Figure 2:
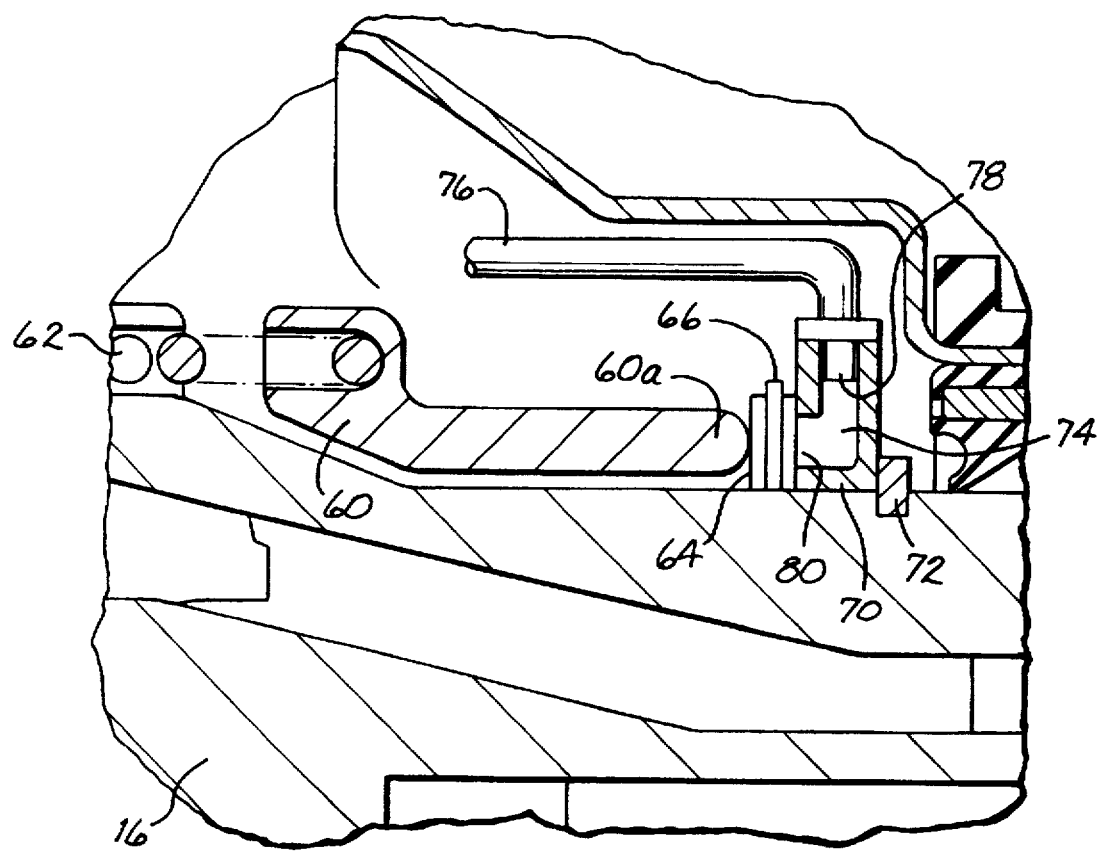

An embodiment of an inventive valve assembly will be explained in more detail in the following with reference to schematic drawings, in which:

FIG. 1 shows a longitudinal section of an inventive valve assembly which is connected with the housing of a brake booster; and FIG. 2 the portion X in FIG. 1 in an enlarged representation.

FIG. 1 shows a valve assembly generally indicated by 10 for controlling a pneumatic brake booster, with only a small part of its housing 12 being illustrated in FIG. 1. Within the housing 12 of the brake booster a movable wall (not shown) is arranged in the conventional manner, which, for example, can be formed by an elastic diaphragm and a rigid support plate and which separates two chambers from each other, the front chamber of which in the normal installed position of the brake booster is permanently connected with a vacuum source, e.g. with the suction line of an Otto engine, and which is therefore also referred to as vacuum chamber. The other, relative to the normal installed position, rear chamber can optionally be connected with the front chamber or with an ambient air inlet. The rear chamber is also referred to as working chamber and is assigned reference numeral 14 in the figures.

The valve assembly 10 has a tubular valve housing 16 which is designed essentially rotation-symmetrical with respect to an axis A and which is securely and tightly connected with the movable wall (not shown). An annular first valve seat 18 is formed within the valve housing 16. A second valve seat 20 which is also of an annular shape and which has a smaller diameter is formed to be coaxial with the first valve seat at a tappet 22 which can be adjusted along the axis A by means of an operating member 24. The operating member 24 can be connected with the brake pedal of a vehicle in the conventional manner.

The two valve seats 18 and 20 are assigned a common valve body 26 which, together with the first valve seat 18, can isolate a radially outer annulus 28 within the valve housing 16 from an annular intermediate space 30 between the two valve seats 18 and 20, and which, together with the second valve seat 20, can isolate an inner space 32 from the intermediate space 30. The radially outer annulus 28 is connected with the vacuum chamber (not shown), while the annular intermediate space 30 is connected with the working chamber 14. The valve body 26 is connected by means of a gasket 34 made of rubber or an elastomer with a supporting sleeve 36 which is installed in the valve housing 16 in a tight and secure manner. The valve body 26 is biased towards the two valve seats 18 and 20 by means of a helical spring 38 which bears against a shoulder 40 of the operating member 24.

Adjacent to the free end of the valve housing 16, a second valve body 42 is arranged in a mirror-inverted manner relative to the first valve body 26 around the operating member 24. The second valve body 42 which is of similar construction to the first valve body 26 is tightly clamped in the supporting sleeve 36 by means of a gasket 44 and, together with a sleeve 46 which is unmovably arranged on the operating member 24, forms a check valve 50. An ambient air inlet 52 which is arranged extending in a circumferential direction in an end cap 54 made of rubber or an elastomer and attached on the free end of the valve housing 16 for sealing same, is connected via a first filter 56 arranged in the end cap 54, the check valve 50 and a second filter 58 arranged in the supporting sleeve 36 with the inner space 32.

The valve housing 16 is concentrically surrounded by a control sleeve 60 in the area of the end facing the movable wall (not shown), which sleeve can be axially moved and is biased by a helical spring 62 towards an additional third valve seat 64 which is formed by a sealing disk 66 which is provided at both sides with an elastic material. Thus, the control sleeve 60 with its end 60a (right-hand side in the figures) forms an additional valve body which normally seals against the third valve seat 64.

The sealing disk 66 is merely slid on a neck-shaped extension 68 of the valve housing 16 and guided by same. The control sleeve 60 which is resiliently biased towards the sealing disk 66 urges the sealing disk 66 which is floatingly arranged on the neck-shaped extension 68 with its face facing away from the end 60a of the control sleeve 60 against a ring 70 which surrounds the valve housing 16 or its neck-shaped extension 68, respectively, and comprises a U-shaped cross-section and which is secured against an axial displacement towards the free end of the valve housing 16 by means of a circlip 72 which is secured in a groove in the neck-shaped extension 68.

As can be seen from FIG. 1 and, in particular, from FIG. 2, the U-shaped cross-section of the ring 70 provides for a hollow space 74 within same, which comprises an inlet 78 connected with an air supply 76 and a circular outlet 80. The hollow space 74 therefore represents an additional venting channel which is fed by the air supply 76, the outlet 80 of which opens into the working chamber 14 and is disposed directly opposite the end 60a of the control sleeve 60 so that it is kept resiliently closed by the double-acting sealing disk 66 in conjunction with the control sleeve 60 and the helical spring 62. In the described embodiment the air supply 76 is connected with an suitable compressed air source (not shown), e.g. a compressed air reservoir. As can also be seen from FIG. 1, the control sleeve 60, the double-acting sealing disk 66 and the ring 70 with its air supply 76 are disposed within the brake booster housing 12 and are therefore arranged protected against dirt.

The tappet 22 at which the second valve seat 20 is formed has an annular groove into which an approximately hair pin-shaped transmission member 82 engages in a secure and clearance-free manner. The transmission member 82 extends from the tappet 22 in a radial direction through a recess 84 in the valve housing 16 and a recess 86 in the control sleeve 60. The transmission member 82 has an axial clearance in both recesses 84 and 86, with the clearance in the recess 84 being larger than the clearance in the recess 86.

In the end of the valve housing 16, which faces the brake booster housing 12, an elastomer body 88 is arranged which is also referred to as reaction disk, and which is enclosed in the circumferential direction by the valve housing 16 and which forms a power transmitter between the operating member 24 and an output member (not shown) which forms an axial extension of the elastomer body 88. A reset spring which is also not shown and arranged in the brake booster housing 12 biases the movable wall between the vacuum chamber and the working chamber 14 as well as the valve housing 16 in a conventional manner rearwards, i.e. to the right-hand side in FIG. 1.

The operation of the valve assembly will be explained in the following:

As long as there is no vacuum in the vacuum chamber of the brake booster, for example, because the engine of the associated vehicle is not running, the valve body 26 contacts the first valve seat 18 due to the stop of the transmission member 82 at the booster housing 12, but does not contact the second valve seat 20, and the additional venting channel which is formed by the hollow space 74 is closed by the sealing disk because of the pressure exerted by the control sleeve 60 onto the sealing disk 66. The working chamber 14 is therefore connected with the ambient air inlet 52 via the inner space 32 of the valve housing 16, while the connection between the vacuum chamber and the working chamber 14 is interrupted.

If the engine of the mentioned motor vehicle is operated, a vacuum is generated in the vacuum chamber, and the movable wall which isolates the vacuum chamber and the working chamber 14 from each other together with the valve housing 16 is moved by a small distance in a forward direction, i.e. to the left-hand side in FIG. 1, against the initially low resistance of the reset spring arranged in the brake booster housing 12, while the operating member 24 and the tappet 22 maintain their rest position. The first valve body 26 which up to this time contacted the first valve seat 18 only therefore slightly contacts the second valve seat 20, and the balanced condition shown in FIG. 1 is attained in which the vacuum chamber is evacuated to the degree as determined by the vacuum source, and in which a pressure prevails in the working chamber 14 which is slightly higher than the pressure in the vacuum chamber but significantly lower than the atmospheric pressure. The brake booster is now ready for operation and can activate a connected master cylinder (not shown) without any further delay.

If a brake pedal which is connected with the operating member 24 is now actuated in a normal manner, the operating member 24 will be moved by a small distance to the left in FIG. 1 and the second valve seat 20 clears the first valve body 26. Under the full force of the helical spring 38 said valve body now exclusively contacts the first valve seat 18 and thus completely isolates the vacuum chamber from the working chamber 14 while simultaneously ambient air flowing through the first filter 56 reaches the annular intermediate space 30 in the working chamber 14 through the check valve 50 which is now open because of the now prevailing pressure gradient and the second filter 58 via the inner space 32 and the annular intermediate space 30, where it moves the movable wall (not shown) together with the valve housing 16 and the power output member (also not shown) in a forward direction so that the connected master cylinder is activated. The outlet 80 of the additional venting channel is still kept closed by the sealing disk 66. Provided that the actuation of the brake pedal continues the described condition is maintained until the ambient pressure is reached in the working chamber 14 and thus the maximum possible pressure difference without compressed air assistance between the vacuum chamber and the working chamber has been achieved. The brake booster has thus reached its point of maximum deflection.

If, on the basis of the condition just described, the brake pedal and thus the operating member 24 is actuated with an increased force the valve housing 16 can no longer move towards the connected master cylinder, i.e. to the left in FIG. 1, and a relative movement between the tappet 22 and the valve housing 16 takes place so that the transmission member 82 abuts the front, in FIG. 1 right-hand, edge of the recess 86 in the control sleeve 60 driving same, which relieves the additional third valve seat 64. The compressed air which is fed through the air supply 76 into the hollow space 74 of the ring 70 displaces the floatingly arranged sealing disk 66 with respect to FIG. 1 in an axial direction to the left so that the outlet 80 of the additional venting channel which is formed by the hollow space 74 is exposed, and compressed air is allowed to flow into the working chamber 14. This compressed air admitted into the working chamber 14 now increases the power in accordance with the available pressure level, i.e. the amplification ratio of the brake booster. The second valve body 42 of the check valve 50 is thereby pressed all the harder against its valve seat 48 the higher the overpressure is which is building up in the working chamber. Any loss of overpressure from the working chamber 14 past the open second valve seat 20 to the environment is therefore prevented by the check valve 50.

As soon as the brake pedal is released the resiliently biased control sleeve 60 again urges the sealing disk 66 against the outlet 80 of the additional venting channel and closes same. Moreover, the first valve body 26 tightly contacts the second valve seat 20 while the first valve seat 18 is lifted off the valve body 26 so that the working chamber 14 is disconnected from the ambient air inlet 52 and connected with the vacuum chamber, whereupon a pressure compensation between the vacuum chamber and the working chamber 14 takes place and the movable components return into their balanced position shown in FIG. 1.

From the above description of the operation it follows that upon a normal brake actuation compressed air is supplied into the working chamber 14 only after the point of maximum deflection of the brake booster has been reached. If, however, the brake pedal is violently stepped on as, for example, in the case of an emergency braking operation, the transmission member 82 makes an earlier contact with the front edge of the recess 86 so that similar to the above described operation compressed air from the additional venting channel flows into the working chamber 14 already at an earlier time so that the high clamping forces which are desired at the brake members for an emergency braking operation are available at an early time.

I claim:

1. A valve assembly (10) for controlling a pneumatic brake booster, comprising a valve housing (16) in which a first and a second valve seat (18, 20) are disposed;

a valve body (26) adapted to be applied to both valve seats (18, 20), which valve body in one position of an operating member (24) is lifted off the first valve seat (18) only, whereby two chambers of the brake booster are connected with each other and both chambers are isolated from an air inlet (52), and in another position of the operating member (24) is lifted off the second valve seat (20), whereby the two chambers are isolated from each other and one (14) of them is connected with the air inlet (52); and an additional venting channel which opens into the chamber (14) of the brake booster adapted to be connected with the air inlet (52) and which is controlled by an additional valve (60a, 64) formed by an annular third valve seat (64) which is disposed radially outside the valve housing (16) and by a control sleeve (60) surrounding the valve housing, which as an additional valve body is adapted to be axially displaced with respect to the valve housing (16) and is biased towards the third valve seat (64), with the operating member (24) being connected with the control sleeve (60) by means of a transmission member (82) in such a manner that the additional valve (60a, 64) can be opened by a movement of the operating member (24) which exceeds the movement required for lifting the valve body (26) off the second valve seat (20), characterized in that the additional venting channel is formed by a ring (70) which surrounds the valve housing (16) at least partially, is arranged at an axial distance from the control sleeve (60) on the valve housing (16) and is provided with a hollow space (74) which comprises an inlet (78) connected with an air supply (76) and an outlet (80) which opens into the chamber (14) adapted to be connected with the air inlet (52).

2. The valve assembly according to claim 1, characterized in that the ring (70) has an at least essentially U-shaped cross-section with the open end face of the ring (70) forming the outlet (80) of its hollow space (74).

3. The valve assembly according to claim 1, characterized in that the outlet (80) of the hollow space (74) faces the control sleeve (60) and the third valve seat (64) is an annular closed, double-acting sealing disk (66) which is arranged in an axially floating manner on the valve housing (16) between the control sleeve (60) and the ring (70).

4. The valve assembly according to claim 1, characterized in that the ring (70) is secured against axial displacement by means of a circlip (72).

5. The valve assembly according to claim 1, characterized in that the transmission member (82) is securely connected with the second valve seat (20) and extends under an axial clearance through one radial recess (84, 86) each of the valve housing (16) and the control sleeve (60), with the axial clearance of the transmission member (82) with respect to the valve housing (16) being larger than the axial clearance of the transmission member (82) with respect to the control sleeve (60).

6. The valve assembly according to claim 1, characterized in that the additional venting channel is connected with a compressed air source via the air supply (76).

7. The valve assembly according to claim 1, characterized in that the additional valve (60a, 64) is arranged within a housing (12) of th brake booster.

* * * * *